US009858451B2

(12) United States Patent
Ianni et al.

(10) Patent No.: US 9,858,451 B2
(45) Date of Patent: Jan. 2, 2018

(54) TRANSACTION SCHEDULING SYSTEM FOR A WIRELESS DATA COMMUNICATIONS NETWORK

(71) Applicant: ShotTracker, Inc., Merriam, KS (US)

(72) Inventors: Bruce C. Ianni, Mission Hills, KS (US); Davyeon D. Ross, Overland Park, KS (US); Justin E. Bennett, Newburgh, IN (US); Mike E. Ciholas, Evansville, IN (US); Herb A. Hollinger, Mount Vernon, IN (US); Kyle D. Singer, Evanville, IN (US); Dirk B. VanVorst, Evansville, IN (US)

(73) Assignee: SHOTTRACKER, INC., Merriam, KS (US)

( * ) Notice: Subject to any disclaimer, the term of this patent is extended or adjusted under 35 U.S.C. 154(b) by 14 days.

(21) Appl. No.: 15/088,853

(22) Filed: Apr. 1, 2016

(65) Prior Publication Data

US 2016/0292469 A1 Oct. 6, 2016

Related U.S. Application Data

(60) Provisional application No. 62/141,751, filed on Apr. 1, 2015.

(51) Int. Cl.
*G06K 7/10* (2006.01)
*H04W 72/04* (2009.01)
(Continued)

(52) U.S. Cl.
CPC ..... *G06K 7/10029* (2013.01); *G06K 7/10207* (2013.01); *H04W 72/0446* (2013.01);
(Continued)

(58) Field of Classification Search
CPC ......... G06K 7/10; H04W 72/04; B08B 13/14; H04L 7/00; H04L 1/18; H04M 1/00;
(Continued)

(56) References Cited

U.S. PATENT DOCUMENTS

| 6,177,861 B1 * | 1/2001 | MacLellan | G06K 7/10297 340/10.1 |
| 6,946,950 B1 * | 9/2005 | Ueno | G06K 7/0008 340/10.1 |

(Continued)

FOREIGN PATENT DOCUMENTS

WO 2006038163 A1 4/2006

*Primary Examiner* — Nam V Nguyen
(74) *Attorney, Agent, or Firm* — Grady L. White; Potomac Law Group, PLLC

(57) ABSTRACT

System and method for scheduling and coordinating transmission signals in a wireless data communications network, comprising a master node and at least one tag node. In some embodiments, the network may also include a slave node. The master node divides time into repeating time division blocks comprising a configuration window and at least one transaction window. During the configuration window, the master node provides operating parameters to the tag or slave nodes, including a time slot within the transaction window that is reserved for the tag or slave nodes to broadcast data to the master node. The transaction window is subdivided into multiple reserved time slots, and each slot is assigned to a specific tag or slave node. When a reserved time slot arrives, the tag or slave node will broadcast data signals to the master node. The master periodically adjusts the transmission schedule for each tag or slave node, as needed, to ensure that every tag or slave node continues to broadcast only during its reserved time slot, thereby reducing communication data collisions and optimizing the overall performance and throughput of the data communications network.

32 Claims, 5 Drawing Sheets

(51) Int. Cl.
*G08B 13/14* (2006.01)
*H04L 7/00* (2006.01)
*H04M 1/00* (2006.01)
*G08C 17/00* (2006.01)
*H04B 1/38* (2015.01)
*H04W 74/04* (2009.01)
*H04W 74/00* (2009.01)
*H04W 84/20* (2009.01)

(52) U.S. Cl.
CPC .......... *H04W 74/04* (2013.01); *H04W 74/002* (2013.01); *H04W 84/20* (2013.01)

(58) Field of Classification Search
CPC .. G08C 17/00; H04B 1/38; H04J 3/24; H04Q 5/22; A63B 69/00; A63B 71/06
USPC ......... 340/10.1–10.5, 572.1, 572.8; 455/574; 370/311, 95.1, 342, 441, 328, 349; 714/746, 748–751
See application file for complete search history.

(56) References Cited

U.S. PATENT DOCUMENTS

| | | | |
|---|---|---|---|
| 6,960,999 B2* | 11/2005 | Haimovitch | G06K 7/10039 340/10.33 |
| 7,843,348 B2 | 11/2010 | Hayford et al. | |
| 8,248,212 B2* | 8/2012 | Frederick | H04L 1/0052 340/10.1 |
| 8,289,170 B2 | 10/2012 | Pryor et al. | |
| 8,687,546 B2* | 4/2014 | Gong | H04L 1/1685 370/328 |
| 9,041,546 B2 | 5/2015 | Pryor et al. | |
| 2004/0160310 A1* | 8/2004 | Chen | G06K 7/10039 340/10.2 |
| 2005/0225437 A1* | 10/2005 | Shiotsu | G06K 7/0008 340/10.51 |
| 2006/0052055 A1* | 3/2006 | Rowse | G06K 7/0008 455/41.1 |
| 2008/0298280 A1* | 12/2008 | Joshi | H04W 64/00 370/280 |
| 2011/0176464 A1 | 7/2011 | Warner et al. | |
| 2013/0182718 A1 | 7/2013 | Kim et al. | |
| 2014/0247817 A1 | 9/2014 | Lim et al. | |
| 2015/0071158 A1 | 3/2015 | Fan et al. | |

* cited by examiner

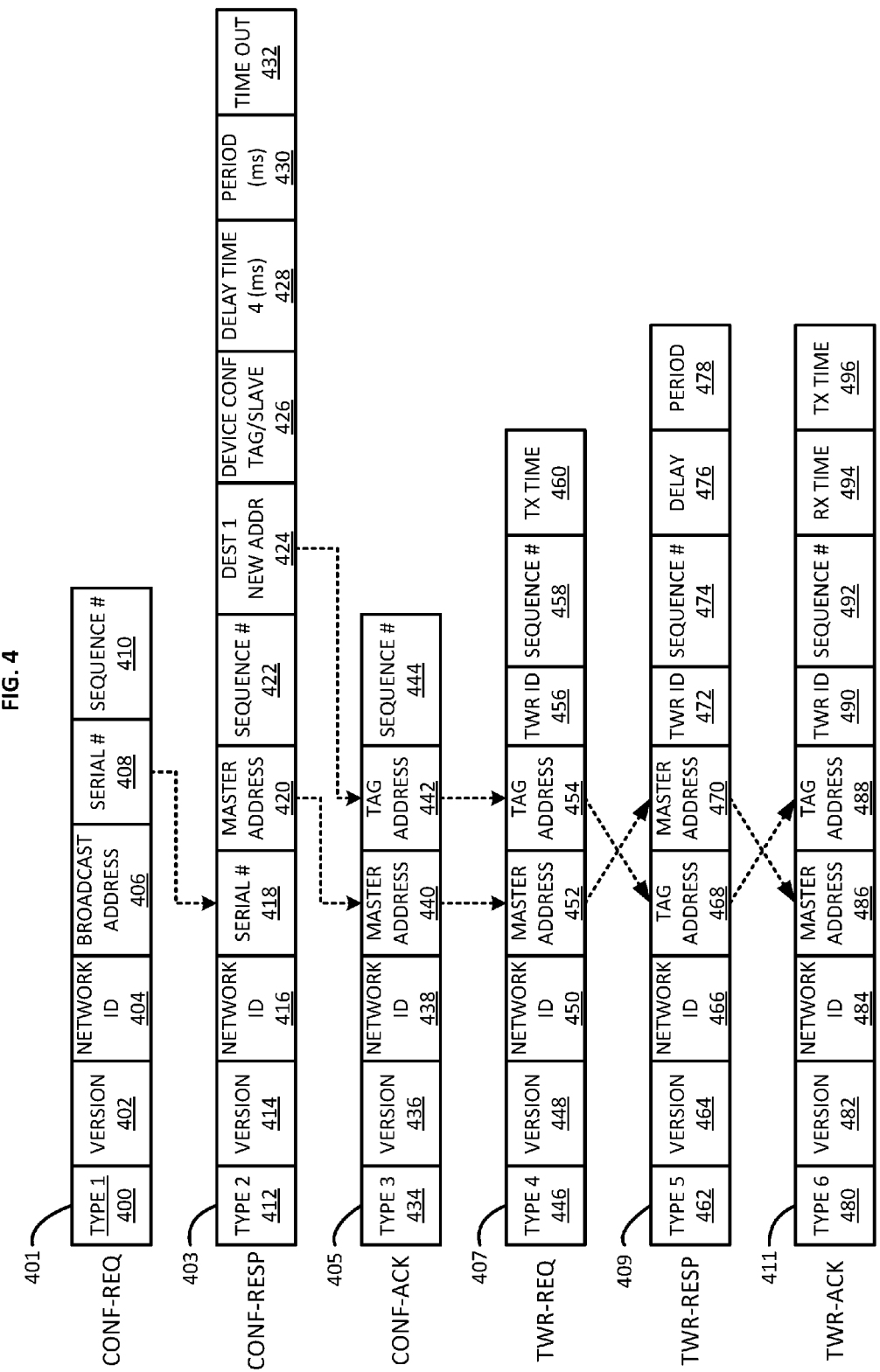

TRANSACTION SCHEDULING SYSTEM FOR A WIRELESS DATA COMMUNICATIONS NETWORK

CROSS-REFERENCE TO RELATED APPLICATIONS

This application is related to and claims priority under 35 U.S.C. §119 to U.S. provisional patent application No. 62/141,751 filed on Apr. 1, 2015, which is incorporated into this application in its entirety by this reference.

FIELD OF ART

The present invention relates generally to devices and methods for coordinating digital transmission signals in wireless data communication networks, and more particularly to wireless data communications networks wherein a master node with a limited bandwidth needs to receive, distinguish and process data transmissions generated and broadcasted by a large number of other nodes in the network.

BACKGROUND

Digital information can be conveyed over any medium capable of carrying an electromagnetic radio wave signal. Thus, a broad range of the electromagnetic spectrum may be used for wireless data communications between electronic devices. Radio frequencies falling in the range of approximately 3 kHz to 300 GHz are commonly used for communication and ranging, and the transmission equipment and methods employed in wireless data communication (WDC) varies widely. An important subcategory of wireless data communication network is the wireless sensor networks (WSN), in which a plurality of autonomous sensors is arrayed such that each sensor becomes a node in a network, separated by some distance in space. This type of distributed data network is suitable for applications that utilize data from multiple sources for which a hard-wired solution would be impractical or impossible. A wireless sensor network can be instrumental in controlling and tracking inventories of physical objects, monitoring geological or meteorological events, and accumulating individual and/or population data from a group of persons, such as patients in a hospital. There are many established standards and protocols available for wireless data communication networks, each with their distinct advantages and limitations. One well-known approach is the ALOHA protocol, in which each node in the network transmits any time it has data to send. This is a relatively uncomplicated method to implement, as each node operates on a set of very basic instructions. However, the ALOHA protocol makes no provision for the collision of simultaneously broadcast signals within a given channel, therefore, each node in the ALOHA network can conceivably start transmitting at any time, resulting in jamming and loss of information. As such, ALOHA cannot use 100% of the capacity of the available channels and is known to be highly inefficient. A wireless data communications network implementing a pure ALOHA protocol can only use approximately 20% of its operating time for successful transmission of data. Other methods of wireless data communications have been developed that improve on this in efficiency, but the challenge of achieving optimal throughput of data is typically made more difficult as network traffic load increases.

Accordingly, there is a need for a more efficient system and method of wireless data communication that is able to utilize more channel capacity and preserve the fidelity of the data signals being transmitted, all while optimizing the power being used by each node of the network. Such a system would dramatically improve the efficiency and power consumption in wireless networks in general, and particularly in wireless sensor networks in which a plurality of nodes may be joining and leaving the network at any point during its operating time.

SUMMARY OF EXEMPLARY EMBODIMENTS OF THE INVENTION

The present invention addresses this need by providing devices and methods for coordinating data transmissions among active nodes in a wireless data communications network by precise scheduling and continual management of transmission time intervals for each node. In general, the system comprises a "master" node, which tracks the passage of time, admits new nodes, called "tags," to the network, and establishes and controls a schedule for all data transmissions for all of the tag nodes admitted to the network. The master node specifies discreet transmission time intervals, termed reserved time slots, for each node. The reserved time slots are subdivisions of larger time intervals, termed windows, which are themselves subdivisions of larger blocks of time, called time division blocks. As tag nodes are added to the network, each tag is assigned a reserved time slot in which to exchange transaction packets with the master node. The master node is configured to detect and process transaction packets broadcast by the tag nodes during their reserved slots of time, and in turn transmit additional timing instructions back to each tag node, if necessary, to ensure that each tag node's data transmission activity continues to occur within its reserved time slot. Some embodiments of the present invention may be configured to track players, officials, and objects moving about a zone, field or court during sporting activities such as games of basketball, football, or hockey. It will be understood by those skilled in the art, however, that the systems and methods discussed herein can be used in a variety of different types of wireless data communication networks configured to exchange data for a wide variety of different purposes and situations.

The time division blocks, which are defined by the master node, include a configuration window and at least one transaction window. Depending on the required functions of the system, a single data communications network may include different types of tags. Additional transaction windows can be added as needed to accommodate the different types of tag nodes operating within the network. During the configuration window of the time division block, the master detects and processes configuration request packets broadcast by new tags wishing to join the network and start exchanging data with the master. In response to receiving a configuration request from a new tag during the configuration window, the master establishes a reserved time slot within the transaction window for the new tag, and then broadcasts a configuration response packet to the tag, which provides the reserved time slot to the tag, along with specific operating parameters for the tag to follow, including an initial time delay for the tag to wait before making its first attempt to broadcast a set of transaction packets. The master may detect and admit multiple tag nodes to the network during the configuration window, thereby establishing reserved time slots and initial time delays for all of the admitted tag nodes. During the transaction window, when the reserved time slot for a particular tag node arrives, the master detects and processes the set of transaction packets broadcast by that particular tag.

BRIEF DESCRIPTION OF THE FIGURES

The various advantages of the embodiments of the present invention will become apparent to one skilled in the art upon reading the following specification and appended claims, with reference to the appended drawings, in which:

FIG. 4 shows a schematic diagram illustrating some of the information that could be transmitted in each type of data transmission packet in one embodiment of the present invention.

DETAILED DESCRIPTION OF EXEMPLARY EMBODIMENTS

Non-limiting examples of devices and methods arranged and performed according to certain embodiments of the present invention will now be described in some detail by reference to the accompanying figures.

Figure 1:
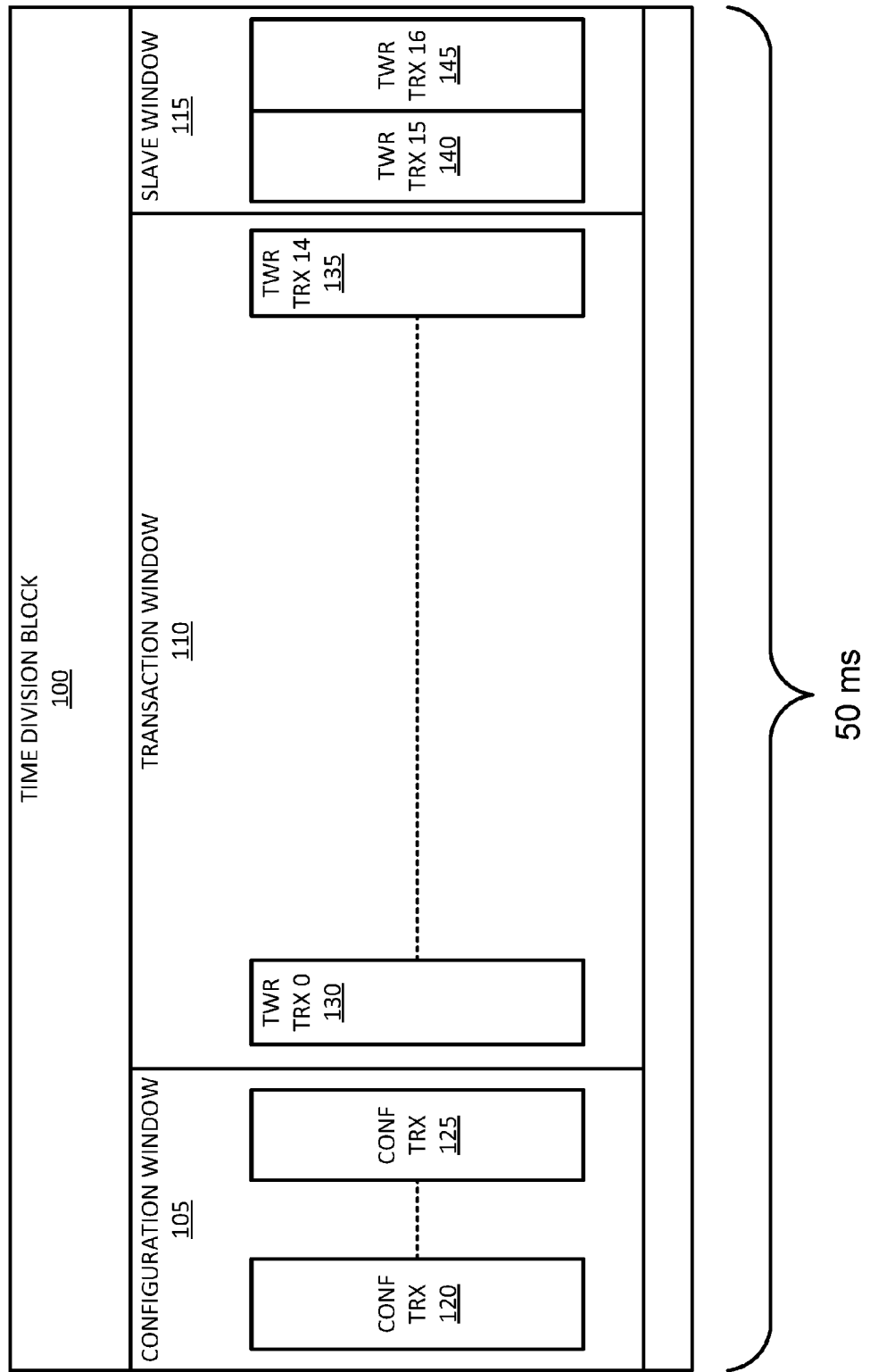
FIG. 1 is a diagram representing the structure of a time division block that may be used in one embodiment of the present invention.

In embodiments of the present invention, the master node measures and divides the passage of time into a continuous stream of adjacent time division blocks. FIG. 1 shows an example of a time division block 100 as may be defined by the master node in one embodiment of the present invention. Each time division block 100 spans a fixed length of time, such as 50 milliseconds long. It is understood by those in the art, however, that time division blocks of shorter or longer intervals may be used, depending on the number, type and transmission speeds of the tags used in the wireless data communications network. When the length of the time division block is defined to be 50 milliseconds long, then the network repetition cycle is 20 Hz (i.e., each second comprises 20 consecutive time division blocks). If the time division block 100 is too large, then the master node will not be able to receive and process consecutive signals from rapidly-moving tag nodes fast enough to track their current locations in real time. If the time division block 100 is too small, then it will not have sufficient room to reserve time slots for a large number of tag nodes.

As shown in FIG. 1, the time division block 100 comprises three separate subdivisions of time, including a configuration window 105, a transaction window 110, and a slave window 115. The configuration window 105, which is reserved for configuration functions, such as detecting and admitting new tag nodes, lasts 20 ms, and is further divided into discrete time slots 120 to 125, during which configuration data packets are exchanged.

The transaction window 110 lasts 20 ms, and is further subdivided into fifteen reserved time slots 130 to 135, during which the master receives and processes transaction packets broadcasted by tag nodes operating in the wireless data communications network. All of the transactions between the master node and tag nodes occur within these reserved slots 130 to 135. This partition of the transaction window 110 can accommodate data packet exchanges with up to 15 tag nodes. Optionally, the system can also allocate a third segment of time called the slave window 115, which lasts 10 ms. Within slave window 115, signals from up to 2 slave nodes can be exchanged during reserved time slots 140 and 145.

Figure 2A:
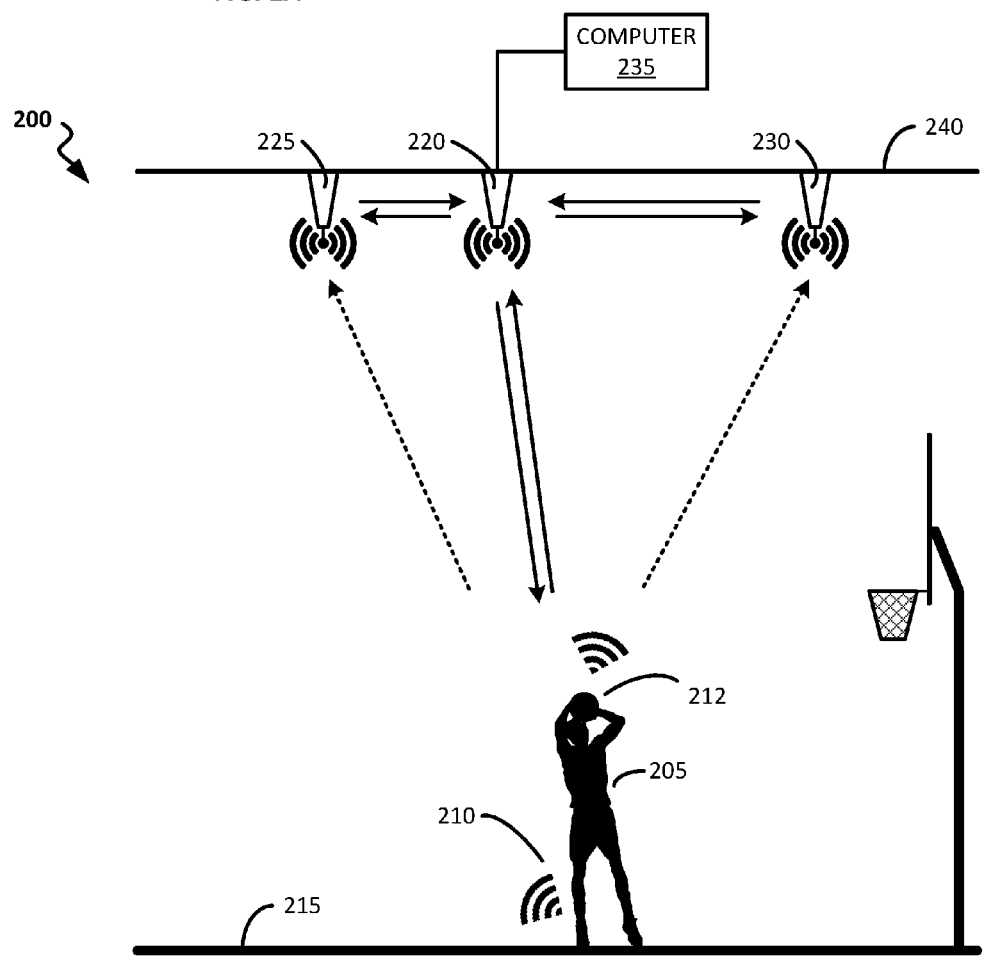
FIG. 2A is a schematic diagram of a data communications network configured to operate according to one embodiment of the present invention, wherein the network is configured to track the location of a basketball player and a basketball on a basketball court.

FIG. 2A shows an example of how one embodiment of the present invention may be configured and used in a real-world situation. It will be understood, however, that the scope and application of the invention is not limited by this particular example. In the example shown in FIG. 2A, a wireless sensor network 200 is used as a means of monitoring the locations of a basketball player 205 and a basketball. In this example, the network 200 is configured to use two-way radio ranging as a means of monitoring and tracking the location and movements of the basketball player 205 and the ball 212 on a basketball court 215, although other methods of ranging, as opposed to two-way ranging, may also be used with embodiments of the present invention.

As shown in FIG. 2A, a wireless sensor network 200 comprises a master anchor 220 and two slave anchors 225 and 230, along with at least one tag node 210 attached to the player 205 and at least one other tag node 212 attached to the inside of the basketball. Each node in the wireless sensor network 200 comprises a radio transponder. Anchor nodes 220, 225 and 230 are placed at known distances from each other in designated locations near the basketball court 215, such as in the rafters 240 suspended above the basketball court 215. In some embodiments, the optimal distance between the master anchor node 220 and slave anchor nodes 225 and 230 may be somewhere between about 15 to 25 feet. However, shorter or longer distances may be used, so long as the selected distance between the nodes provides acceptable signal fidelity. The wireless sensor network 200 shown in FIG. 2A employs a particular two-way ranging method called "snooping," in which the player tag 210 and the basketball tag 212 exchange data packets directly with the master anchor node 220, and the slave anchors 225 and 230 simultaneously listen for the data transmissions emanating from the player tag node 210 and the ball tag node 212. The slave anchors 225 and 230 transmit their own data packets to the master anchor 220 during the slave window 115 of time division block 100 shown in FIG. 1. This additional snooping data from the slave anchors 225 and 230 is then used by a computer 235 connected to the master anchor node 220 in the wireless sensor network 200 to calculate the locations of the player tag node 210 and the ball tag node 212.

The master anchor 220 can be its own transponder, acting as a gateway node through which the computer 235 can access the wireless sensor network, or it could be incorporated directly into the computer 235. In one embodiment, the computer 235 connected to master anchor node 220 may be configured to apply well understood ranging techniques, such as two-way ranging, to determine the locations of the tag nodes 210 and 212 in real-time. This is achieved by the computer 235 continuously processing information conveyed in the exchange of data packets between each active node joined to the wireless sensor network 200 during each time segment of the time division block 100 shown previously in FIG. 1. The tag nodes 210 and 212 will perform their ranging functions during their reserved time slots within reserved time slots 130 to 135 of the transaction window 110, and the slave nodes 225 and 230 will transmit their data during their reserved time slots within the reserved time slots 140 and 145 of slave window 115, as depicted previously in FIG. 1.

Figure 2B:
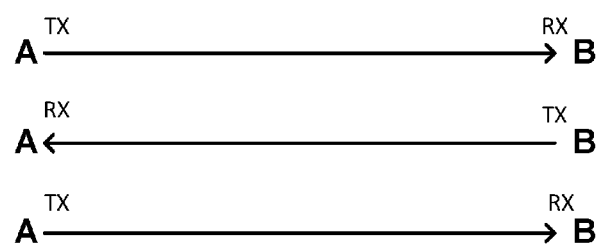
FIG. 2B is a high-level diagram showing the order and direction of travel for the packet transmission in a two-way ranging transaction between nodes within the network depicted in FIG. 2A.

FIG. 2B shows a typical ranging transaction between two nodes at point A and point B. If the clocks in the nodes at points A and B were perfectly in sync with each other, then a single packet would suffice for the localization calculations. However, even though modern electronics are very close in terms of clock rates (to within millionths of a second), they can never achieve absolutely perfect synchronization, and initially slight discrepancies between the clocks multiply over time, causing the clocks in the separate nodes to drift farther and farther apart from each other. Due to this fact, each node in the network is assumed to have its own time domain. Three packets are exchanged between the nodes at points A and B, with a timestamp relative to each node's time domain generated by each unique transmission event and reception event (i.e., six timestamps). The node at point A initiates, and the node at point B calculates. In the implementation of the two-way ranging system shown in FIG. 2A, the data rides as a data payload on the last packet sent. This ranging data piggybacks on packets without compromising arrival times of the signals.

While the wireless sensor network 200 will function adequately with only two anchor nodes, a master 220 and a single slave 225, additional slave anchors, such as slave anchor 230, may be added to the network to increase the precision and fidelity of the location data and avoid problems that might arise, for example when a direct line of sight between a tag and one anchor is obstructed by a person or object on the court 215.

Figure 3A:
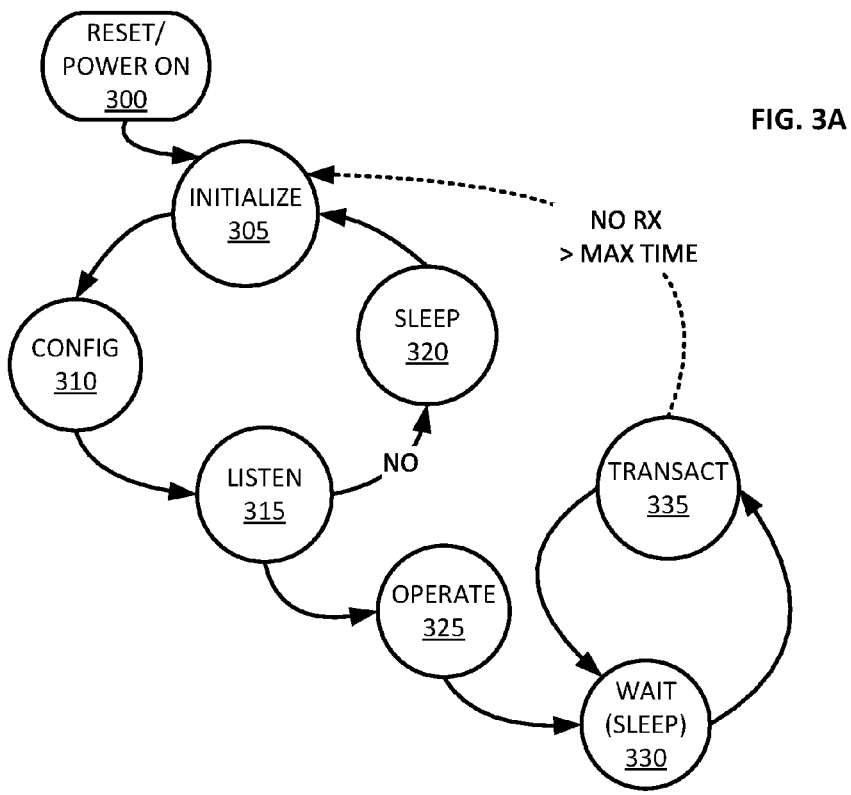
FIGS. 3A and 3B are high-level state diagrams illustrating the various states and functions for a tag node and a master node as executed by one embodiment of the present invention.

FIG. 3A shows a state diagram for an active tag node as used by an exemplary embodiment of the present invention. Following a power-on or reset state 300, the tag first enters an initialization state 305, in which the parameters defined by the firmware within the tag's electronic chip are initialized. The tag next enters a configuration request state 310, in which the tag broadcasts a configuration request to announce its presence to the network and to request operating instructions from the master. Next, the tag will enter a listening state 315, in which the tag listens for a response from the master to its configuration request. If no response is received while the tag is in the listening state 315, then the tag will reduce its power consumption and enter a sleeping state 320 for a randomly assigned time period of between one and three seconds before reawakening and returning to the initialization state 305. Although the tags can be potentially disruptive in the event of signal collisions within a channel until said tag's beacon falls within the configuration window, the configuration request signal is extremely short, minimizing any potential for signal jamming or data loss.

If the tag receives a configuration response containing operating instructions from the master while it is in the listening state 315, then the tag next enters an operational state 325, in which the tag processes configuration parameters provided by the master node. One such configuration parameter comprises an initial delay period that the tag should wait before beginning to broadcast transaction packets to the master. The tag next enters a waiting state 330 for a period of time equal to the initial delay period, during which the tag reduces its power consumption and sleeps.

When the initial delay period has expired, the tag enters a transaction state 335. In one embodiment of the present invention, the tag exchanges transaction packets, such as ranging packets, with the master during the transaction state 335. However, the network may be configured to exchange any other types of data during the transaction window, and not just ranging data. Following the first exchange of transaction packets, the tag moves back into the waiting state 330, and waits for the next reserved time slot in the next transaction window of the next time division block before returning again to the transaction state 335.

As the tag moves through states 305, 310, 315, and 320, the packets exchanged with the master include a configuration request, a configuration response, and a configuration acknowledgment. In one embodiment, the configuration window is approximately 500 microseconds long. Configuration packet exchanges are only initiated by tags that have not yet been configured, and the master device will only respond to a configuration request if it hears the configuration request within 600 microseconds of the end of the configuration window, thus preventing configuration packet exchanges from interrupting or delaying tag or slave packet exchanges. If the configuration initiating tag hears the configuration response within 1.5 ms of sending a configuration request, it will respond with a configuration acknowledgment packet, and then schedule a ranging transaction so that it occurs during the reserved time slot of the transaction window. If the initiating tag does not hear a response within 1.5 ms, then it will enter the sleep state 320 for a random amount of time (typically between one and three seconds) before attempting to send another configuration request.

The configuration response transmitted by the master device contains the initial delay period that the tag should wait before attempting to broadcast a two-way ranging transaction to the master. The configuration response also contains the tag's transmission period, the network ID (used when multiple networks are available) and the network timeout. The network timeout tells the tag how many consecutive times the device should attempt to communicate with the master without receiving a response from the master. The data contained in each configuration packet in one embodiment of the present invention is discussed in greater detail below with reference to FIG. 4.

For the purpose of providing a more detailed explanation of the present invention, and more fully illustrating the operation and some of the benefits it provides, an embodiment of the present invention that uses two-way ranging transactions to locate people and objects will now be discussed in some detail. It will be understood by those skilled in the art, however, that the invention is not limited to networks that use two-way ranging transactions, or any ranging transactions at all. In other words, embodiments of the present invention may be usefully applied in data communication networks that use a variety of other types of ranging techniques, as well as in data communications networks where ranging (and/or determining current locations for nodes) is not necessary or desirable.

In the exemplary embodiment of the present invention that uses two-way ranging for the purpose of determining current locations of tags, the data packets exchanged with the master while the tag is in transaction state 335 may include a two-way ranging request, a two-way ranging response, and a two-way ranging acknowledgment. It takes approximately 5 ms for a tag to wake up from a sleeping state. In this embodiment, a tag transaction is approximately 1 millisecond in length. If a tag has more than 10 ms before its next scheduled transaction (twice the amount of time it takes for the tag to wake up), then it will sleep until approximately 5 ms before its next transmission, and then wake up in time to be ready to transmit during its reserved time slot 130 to 135 shown previously in FIG. 1. Therefore, if the time division block is 50 ms, and the transaction packet exchange lasts for 1 ms, then the tag will sleep for approximately 44 ms of each time division block. At the scheduled transaction time, the tag sends a transaction packet, such as a two-way ranging request, to the master. In preferred embodiments, the tag uses the period it received from the master in its last communication with the master in order to schedule the next tag transaction, which reduces the drift that might otherwise occur if the tag's clock moves at a rate that is slightly different from the rate of the master's clock.

When the master receives a two-way ranging request, it generates a two-way ranging response. This response contains the delay that the tag should wait before sending the next two-way ranging request, the period value, and other network data. If the tag receives a two-way ranging response from the master, then it will respond with a two-way ranging acknowledgment packet and update its scheduled tag transaction time with the adjusted delay received in the two-way ranging response. If the tag does not receive a two-way ranging response within 1.5 ms, then it will use the period last assigned by the master to determine the next transaction time. At the end of the two-way ranging transaction, or after the reception timeout expires, the tag returns to a low power sleep state. The data contained within each type of transaction packet used by one embodiment of the present invention is discussed in greater detail below with reference to FIG. 4.

Figure 3B:
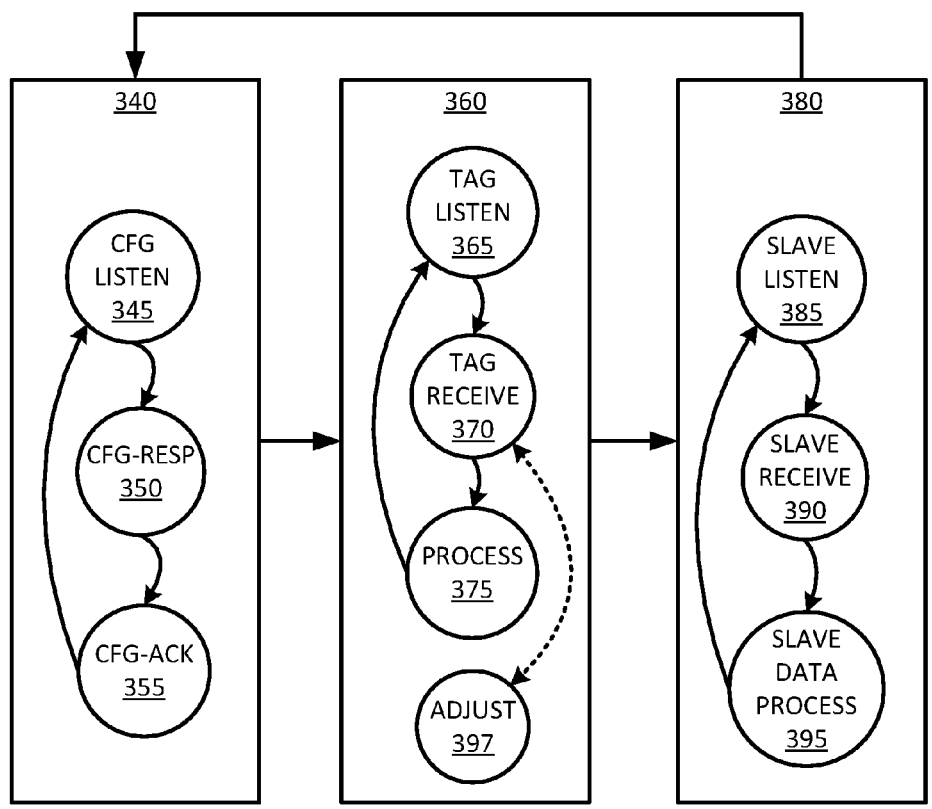

FIG. 3B shows a state diagram for the master anchor as used by an exemplary embodiment of the present invention. As shown in FIG. 3B, the master cycles through three separate phases of operation, corresponding to the three windows in the time division block, beginning with a configuration phase 340, in which the master detects configuration request packets broadcast by any new tags that are not already member of the master's data communications network and wish to be added to the network. This is followed by a transaction phase 360, during which the master node and tag nodes exchange transaction packets. Finally, the master enters the slave phase 380, during which the master node exchanges two-way ranging data packets with the slave nodes.

In the configuration phase 340, which corresponds to the configuration window 105 of FIG. 1, the master moves through several distinct states. The master anchor first listens for any configuration requests broadcasted by new tags attempting to join the network (configuration listening state 345). Upon detection of a configuration request from a new tag not yet joined to the network, the master will move to a configuration response state 350, in which the configuration parameters specific to the new tag are assembled and transmitted back to the tag. This is followed by a final configuration acknowledgment state 355, where the master attempts to receive and process a confirmation message from the new tag confirming that the new tag has successfully received and processed the configuration parameters transmitted by the master. The master then returns to the listen state 345.

In this manner, the master receives and processes configuration requests and sends configuration parameters back to the tags, relaying to the tags crucial operating parameters such as their repeat rate, when the tags will begin transmitting relative to when each tag entered network, where in the transaction window the tag's reserved time slot falls, and when to transmit transaction packets relative to each tag's time domain. The master may also be configured to tell the tag how long it should wait to receive responses from the master before timing out (network timeout parameter), as well as how many times to repeat a configuration request before the tag assumes that no network is available and shuts down.

Within the transaction phase 360, which corresponds to the transaction window 110 shown previously in FIG. 1, the master exchanges transaction packets in a sequential manner with each of the tags currently joined to the network, first listening for transmissions from the tags in tag listening state 365, then receiving and analyzing transaction packets from the tag in receiving state 370, and finally processing transaction packets in the transaction processing state 375. The master has the ability to determine how accurately each tag transmits within its reserved time slot by analyzing transmission time stamps upon receipt and comparing this information to the list of reserved time slots, entering an adjustment state 397, as necessary, to account for any drifting toward the boundaries of the reserved time slot. Details of the operation of the master during the adjustment state 397 are discussed in greater detail below with reference to FIG. 5B.

Within the slave transaction phase 380, which corresponds to the slave window 115 shown previously in FIG. 1, the master exchanges data packets with the slave nodes. First the master listens for transmissions from slaves in slave listening state 385. Then the master receives transmitted signals from the slaves during receiving state 390. Finally, the master processes the snooping data discussed above during the slave data processing 390. In one exemplary embodiment, the slave data packet exchange includes a two-way ranging request, a two-way ranging response, and a two-way ranging acknowledgment between a slave node and a master node. A slave transaction may be approximately 3 milliseconds in length. Slave transactions are similar to tag transactions, except that slaves do not sleep, and the final packet of a slave transaction is a two-way ranging acknowledgment packet, on which the snoop data piggybacks as additional payload.

For the purpose of scheduling, the master may be configured, in some embodiments, to first sort the list of tags and slaves in the network by device type and repeat rate. The tags are placed in the list first, and are then sorted by their repeat rates such that lower repeat rates are scheduled first in the transaction window. All devices are then assigned transaction numbers and phases. Time slots in the transaction window are reserved and assigned to tags based upon their repeat rate settings. In one embodiment of the present invention, if a tag's repeat rate setting is such that it does not perform two-way ranging during every time division block 100 (shown in FIG. 1), then that tag may be instructed by the master to share a reserved time slot with one or more other tags that do not require exchanging two-way ranging packets during every time division block 100. For example, if two tags are sharing a reserved time slot, then each tag will transmit transaction packets in alternating fashion, every other time the reserved time slot occurs. If the repeat rate setting corresponds to a repeat rate of 20 Hz, which is equal to 50 milliseconds per each cycle (the magnitude of the time division block 100), then that tag is expected to transmit transaction packets every single time that the reserved time slot occurs and does not share that time slot with any other device. In this manner, the 15 tag transaction slots are filled. Slaves are assigned time slots in the order they are received from the master. The slaves are always configured so that their repeat rate is equivalent to the length of the time division block (50 milliseconds).

FIG. 4 shows the order of fields in each packet for each type of data transmission packet exchanged between the nodes of on exemplary embodiment of the present invention. As shown in FIG. 4, there are six types of data transmission packets used in the configuration and transaction events during operation of the system.

The configuration request packet 401 contains data in binary form, beginning with an identification of the packet type 400, information about the packet version 402, and the network ID 404, which would be needed if multiple wireless data communications networks are operating in close proximity to each other. The configuration request packet 401 also carries the broadcast address 406, and the specific serial number 408 for the tag sending the configuration request packet 401. This serial number is unique to each tag manufactured of a particular model, and is included so that the system can recognize what data protocols will be needed for the successful exchange of data. A final element of configuration request packet 401 is a sequence number 410, which is an arbitrary number that increments for each transmission, providing a particular number for every event during the operation of the system.

The configuration response packet 403 also contains a field 412 that identifies the type of packet, followed by the packet version field 414, and the network ID field 416. The serial number field 418 will be the same serial number used in field 408 of the configuration request packet 401 and serves to confirm that the master is transmitting a configuration response packet 403 meant for the specific tag that transmitted the configuration request packet 401. Also contained in the configuration response packet 403 is the master address field 420, a sequence number field 422, and a destination address field 424. Field 424 contains the device configuration data for that particular tag or slave. Field 428 contains the delay time in milliseconds, which tells the tag how long it should wait until beginning its first data transaction, and field 430 contains the period in milliseconds, which tells the tag how long to wait to repeat its transmission relative to its own time domain. The last field 432 in the configuration response packet 403 contains the time out parameter, which tells the tag how long it should wait if no response is received from the master during the transaction window. Fields 412-422 are considered to be the "header" data for configuration packet 403, while fields 424-432 are considered to carry the "payload."

The configuration acknowledge packet 405 contains the packet type field 434, the packet version field 436, the network ID field 438, the master address field 440, which will be the same data used in the master address field 420 of the configuration response packet 403. The tag address field 442 will have the same data as the destination address field 424 from the configuration response packet 403, which ensures that the tag and master transmit to one another during each packet transaction. A sequence number field 444 completes the configuration acknowledge packet 405.

The two-way ranging request packet 407, two-way ranging response packet 409, and the two-way ranging acknowledgment packet 411 are exchanged by the master and tags during the transaction windows. The two-way ranging request packet 407 contains the packet type field 446, the packet version field 448, the network ID field 450, and the master address field 452, followed by the tag address field 454. Next is the two-way ranging ID field 456, which is an identifier unique to that particular two-way ranging transaction. The sequence number field 458 follows, and the transmission time field 460 completes the two-way ranging request packet 407.

The two-way ranging response packet 409 contains the packet type field 462, the packet version field 464, the network ID field 466, and the tag address field 468, which carries the same information as the tag address field 454 of the two-way ranging request packet 407. The master address field 470 contains the same information as the master address field 452 of the two-way ranging request packet 407. Next is the two-way ranging ID field 472, which contains the same identifier as the two-way ranging ID field 456 of the two-way ranging request packet 407. The sequence number is contained in field 474, the delay parameter field 476, and the transmission period is provided in field 478. In the two-way ranging response packet 409, the delay field 476 and period field 478 are the payload and serve as a means of adjusting the start of the tag transmissions during each two-way ranging transaction to ensure that each tag continues to transmit during its reserved slot.

The two-way ranging acknowledgment packet 411 contains the packet type field 480, the packet version field 482, the network ID field 484, and the master address field 486, which carries the same information as the master address field 470 of the two-way ranging response packet 409. The data contained in the tag address field 488 is the same information as the data in tag address field 468 of the two-way ranging response packet 409. The two-way ranging ID field 490 follows, and it contains the same identifier as the two-way ranging ID field 472 of the two-way ranging response packet 409. The sequence number is contained in field 492. The final two fields of the two-way ranging acknowledgment packet 411 are the receive time field 494 and the transmit time field 496, which are used to calculate the tag's position.

Other data can be piggybacked to the transaction packets as additional payload, such as biometric information, tag status information, tag battery health, and any other information useful to the system to maintain optimal network performance or to populate an array or database for use as supplementary event analysis.

Figure 5A:
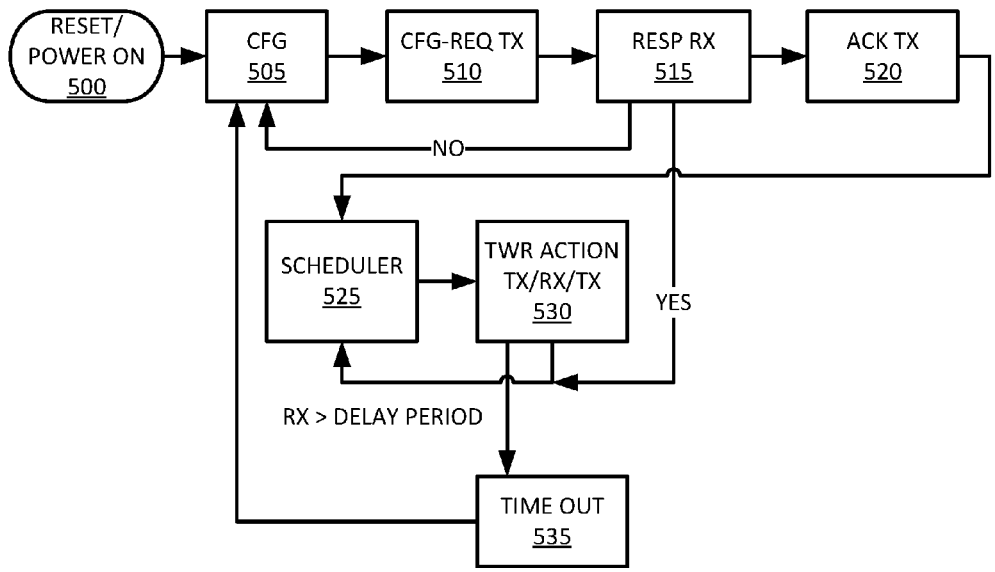
FIGS. 5A and 5B are high-level flow diagrams illustrating an exemplary algorithms for data transmission control processes carried out by a tag node and a master node in one exemplary embodiment of the present invention.

FIG. 5A shows a flow diagram detailing the actions performed by a tag node in one exemplary embodiment of the present invention. The tag first becomes active at the power on or reset step 500. The tag enters the configuration state at step 505 in which it announces its presence to the network. Upon detection by the network, the tag transmits a configuration request 510, receives a configuration response 515, and transmits a configuration acknowledgment 520. If, after transmitting the configuration request in step 510, no configuration response is detected at step 515, the tag returns to the configuration step 505 and again attempts to announce itself to the network. If the tag does receive a configuration response in step 515, information from the configuration response and acknowledge packets are used by the scheduler 525 to direct the two-way ranging actions 530 of transmit, receive, and transmit. If, during the two-way ranging actions of step 530, the tag comes to a point where it does not receive a signal from the master, the tag will enter the time out step 535, which causes the tag to go back to the configuration step 505.

In one embodiment of the present invention, the configuration response data packet provides a network timeout parameter to the tag (see field 432 in FIG. 4). This timeout tells the tag how long it should wait for a response from the master before timing out. Alternately, each time a tag sends a transaction request, a variable denoting the number of times the tag attempted the request timeouts is incremented. Upon the reception of a transaction response, the device resets the attempt counter to zero. Should the attempt counter exceed the predefined threshold, then the tag will drop off the network and begin requesting a new configuration.

Figure 5B:
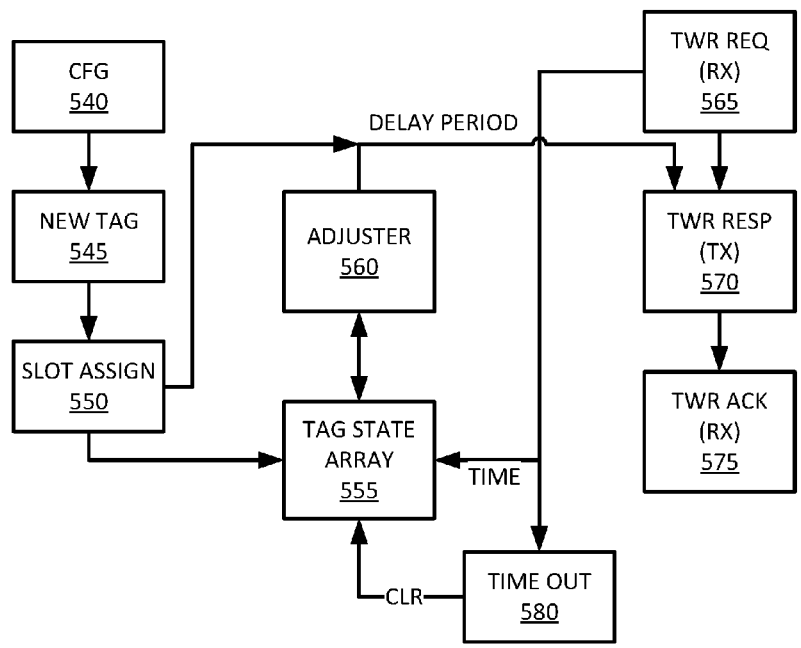

FIG. 5B shows a flow diagram detailing the actions performed by the master node in one exemplary embodiment of the present invention. During the configuration window, the master receives a configuration request at step 540, and determines at step 545 that the configuration request came from a new tag. At step 550, the master assigns a new reserved time slot for the tags' transactions. Information relating to the slot assignment is recorded in a tag state array 555. During the transaction window, the master receives a two-way ranging request from one tag (step 565), transmits a two-way ranging response at step 570, and receives a two-way ranging acknowledgment at step 575. Transmission time information relating to the two-way ranging request received in step 565 is recorded in the tag state array 555. The tag state array is accessed by the adjuster 560, which continually monitors the transmission time performance of the tags to determine how accurately each tag transmits packets within its reserved time slot. The adjuster incorporates time adjustment parameters into the transmission of the two way ranging response 570 when required. The master may also update the tags' delay periods to ensure timely transaction packet transmissions. If the master does not receive a two-way ranging request during the transaction window, the master then proceeds to a time out step 580, during which it may clear the tag state array.

The delay period shown in FIG. 5A for a device's first two-way ranging time ($t_{twr}$) is calculated when a configuration request packet is received by the master. Referring back to FIG. 1, if the request originates from a tag, then the first delay is equal to the time remaining in the configuration window 105, plus the time from the start of the transaction window 110 to that device's reserved transaction slot, which refers to the ordering of transactions within a window, as opposed to the timing of transactions, plus 50000 microseconds multiplied by the number of time division blocks 100 that pass before the specific transaction. The calculation for a slave is essentially the time remaining in the configuration window 105, plus the length of the transaction window 110, plus the time from the start of the slave window 115 to its data packet transaction.

When the transaction response packet is assembled, the system may be configured to include a tag period setting for the tag so that the tag will know when to attempt to retransmit its payload data (should packets be dropped during the first attempt). When the master receives a transaction packet from the tag, the master calculates an adjusted tag period for the tag using the following formula:

$$t_{adjust} = \mathrm{mod}(t_{transaction}, t_{block}) - \mathrm{mod}(t_{rx}, t_{block}),$$

where, $t_{adjust}$ is the adjusted tag period, $t_{transaction}$ is the expected time of receiving the transaction packet, $t_{block}$ is the duration of the time division block, and $t_{rx}$ is the time the packet was actually received.

Tag period setting values correspond to the number of time division blocks between data packet transactions. A tag period setting of 0 is thus 20 Hz, and a tag period setting of 1 is 10 Hz. The tag's next time to start a two-way ranging transaction ($t_{twr}$) is determined by multiplying the number of time division blocks by 50000 microseconds (the size of the time division block). The adjusted tag period ($t_{adjust}$) is added to the start of the next two-way ranging transaction ($t_{twr}$) before it is sent to the tag. The number of blocks until the next two-way ranging transaction is determined by the phase and the tag period setting of the master. The current phase, relative to the requesting tag, is the current time on the master device divided by 50000, modulo the tag period setting for the tag.

The scheduling algorithm of the present invention coordinates the transmission of a plurality of tag nodes joined to a wireless data communications network. Because the nodes each have their own time domains, which are subject to drift relative to each other and to the network, the present invention imposes a precise time scheme for the nodes to take action within a distributed system. The system can determine slot transmission performance with a tolerance of +/−10 microseconds, which is sufficient precision to enable the system to process a plurality of data packet transactions with near 100% use of available channel capacity. This centralized scheduling approach saves battery life at the nodes by having them follow designated time periods, saving power when the node is not transmitting, as radio frequency transmissions can be costly in terms of power used. The whole architecture is biased to save battery power at tag nodes, and only needs to calculate adjustment at one place in the network. Therefore, the tags are not required to take any more actions than are necessary.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. For example, although the invention has been described herein by reference to certain exemplary applications, such as player and ball location tracking during basketball games, the disclosed embodiments of the invention may be modified and adapted for use with many other applications and situations, including situations where determining current locations of people and/or objects is not the main objective. Such variations, modifications and equivalents are intended to come within the scope of the invention and the appended claims.

What is claimed is:

1. In a data communications network comprising a tag and a master, a method for coordinating data communications between the tag and the master, the method comprising:
   a) defining on the master a first time division block, the first time division block comprising a length of time subdivided into a first configuration window and a first transaction window;
   b) during the first configuration window,
      i) receiving on the master a configuration request packet broadcasted by the tag;
      ii) in response to receiving the configuration request, establishing on the master a first reserved time slot within the first transaction window, the first reserved time slot comprising a slice of time during which the master will detect and accept a first set of transaction packets broadcasted by the tag,
      iii) broadcasting a configuration response packet from the master, the configuration response packet comprising a first time delay for the tag, the first time delay comprising an amount of time that the tag should wait before attempting to broadcast the first set of transaction packets to the master, wherein the first time delay is calculated by the master to cause the first set of transaction packets broadcasted by the tag to be broadcasted during the first reserved time slot in the first transaction window;

c) during the first reserved time slot of the first transaction window, detecting and accepting on the master the first set of transaction packets broadcasted by the tag;
d) defining on the master a second time division block, which follows in time after the first time division block, the second time division block being subdivided into a second configuration window and a second transaction window;
e) establishing on the master a second reserved time slot, the second reserved time slot comprising a second slice of time within the second transaction window of the second time division block during which the master will accept a second set of transaction packets broadcasted by the tag;
f) determining on the master a tag period for the tag, the tag period comprising a fixed amount of time that the tag should wait between broadcasting the first set of transaction packets and broadcasting the second set of transaction packets, wherein the fixed amount of time is calculated so that the second set of transaction packets broadcasted by the tag will be broadcasted during the second reserved time slot in the second transaction window of the second time division block;
g) including the tag period in the configuration response broadcasted from the master; and
h) during the second reserved time slot of the second transaction window of the second time division block, detecting and accepting on the master the second set of transaction packets broadcasted by the tag.

2. The method of claim 1, further comprising:
a) determining on the master during the second transaction window that the elapsed time between the master detecting the first set of transaction packets broadcasted by the tag and the master detecting the second set of transaction packets broadcasted by the tag is not equal to the amount of time in the tag period calculated by the master; and
b) broadcasting a transaction response from the master, the transaction response including an adjusted tag period for the tag;
c) wherein the adjusted tag period is calculated by the master to change the amount of time that the tag should wait between broadcasting the second set of transaction packets and broadcasting a third set of transaction packets.

3. The method of claim 2, wherein the adjusted tag period for the tag is calculated by the master according to the formula:

$$t_{adjust} = \mod(t_{transaction}, t_{block}) - \mod(t_{rx}, t_{block}),$$

where, $t_{adjust}$ is the adjusted tag period,
$t_{transaction}$, is the expected time of receiving the transaction packet,
$t_{block}$ is the duration of the time division block, and
$t_{rx}$ is the time the packet was actually received.

4. The method of claim 1, wherein the length of the second time division block is equal to the length of the first time division block.

5. The method of claim 1, wherein the length of the second time division block is not equal to the length of the first time division block.

6. The method of claim 1, wherein the second time division block begins immediately in time after the first time division block ends.

7. The method of claim 1, wherein the second time division block does not begin immediately in time after the first time division block ends.

8. The method of claim 1, further comprising:
a) defining on the master a plurality of time division blocks;
b) defining on the master a plurality of transaction windows within the plurality of time division blocks, respectively;
c) broadcasting from the master a plurality of reserved time slots, each reserved time slot falling within a transaction window in the plurality of transaction windows, respectively, the plurality of reserved time slots marking a plurality of time slices during which the master will accept a subsequently-broadcasted set of transaction packets from the tag; and
d) during at least one of the plurality of reserved time slots in at least one of the plurality of transaction windows in at least one of the plurality of time division blocks, detecting and accepting on the master the subsequently broadcasted set of transaction packets from the tag.

9. The method of claim 8, further comprising:
a) broadcasting the tag period to the tag during at least one of the plurality of configuration windows within at least one of the plurality of time division blocks;
b) wherein the tag period further comprises a fixed amount of time that the tag should wait between each broadcast of the subsequently-broadcasted sets of packets, the fixed amount of time being calculated so that said each broadcast of the subsequently broadcasted set of transaction packets will be broadcasted only during one of the plurality of reserved time slots in the plurality of transaction windows in the plurality of time division blocks.

10. The method of claim 1, further comprising broadcasting from the master a network identifier for the master, the network identifier uniquely identifying the data communications network associated with the master.

11. The method of claim 1, further comprising:
a) broadcasting a two-way ranging request packet from the tag during the first reserved time slot of the transaction window;
b) accepting the two-way ranging request packet on the master during the first reserved time slot of the transaction window;
c) broadcasting a two-way ranging response packet from the master during the first reserved time slot of the transaction window;
d) receiving the two-way ranging response packet on the tag during the first reserved time slot of the transaction window; and
e) broadcasting a two-way ranging acknowledgment packet from the tag during the first reserved time slot of the transaction window.

12. The method of claim 11, further comprising:
a) tracking the transmission and flight times for the two-way ranging request packet, the two-way ranging response packet and the two-way ranging acknowledgement packet;
b) based on the transmission time and flight times, determining the distance between the tag and the master; and
c) based on the distance between the tag and the master, determining the location of the tag in a three-dimensional space.

13. The method of claim 11, wherein the configuration response packet broadcasted by the master further includes a network timeout for the tag, the network timeout indicating how many consecutive times that the tag should broadcast the two-way ranging request packet without receiving the two-way ranging response packet broadcasted by the master.

14. The method of claim 1, wherein:
a) the first configuration window of the first time division block is reserved by the master for exchanging configuration packets between the tag the master;
b) the first transaction window of the first time division block is reserved by the master for exchanging transaction packets between the tag and the master;
(c) the second configuration window of the second time division block is reserved by the master for exchanging configuration packets between the tag the master; and
d) the second transaction window of the second time division block is reserved by the master for exchanging transaction packets between the tag and the master.

15. The method of claim 1, wherein:
a) the data communications network further comprises a slave device; and
b) the first time division block further comprises a slave window, the slave window being reserved for exchanging a set of slave transaction packets between the slave and the master.

16. The method of claim 15, further comprising:
a) broadcasting a two-way ranging request packet from the slave during the reserved time slot of the slave window;
b) accepting the two-way ranging request packet on the master during the reserved time slot of the slave window;
c) broadcasting a two-way ranging response packet from the master during the reserved time slot of the slave window;
d) receiving the two-way ranging response packet on the slave during the reserved time slot of the slave window; and
e) broadcasting a two-way ranging acknowledgment packet from the slave during the reserved time slot of the slave window.

17. A data communications network, comprising:
a) a tag; and
b) a master configured to monitor and process broadcasts from the tag in accordance with a first time division block defined on the master, the first time division block including a first configuration window and a first transaction window;
c) wherein, during the first configuration window,
   i) the tag broadcasts a configuration request packet over the data communications network,
   ii) the master detects the configuration request and establishes a first reserved time slot within the first transaction window, the first reserved time slot comprising a slice of time during which the master will detect and accept a first set of transaction packets broadcasted by the tag, and
   iii) the master determines and broadcasts a configuration response packet over the data communications network, the configuration response packet comprising a first time delay for the tag, the first time delay comprising an amount of time that the tag should wait before attempting to broadcast the first set of transaction packets to the master, wherein the first time delay is configured by the master to cause the first set of transaction packets broadcasted by the tag to be broadcasted during the first reserved time slot in the first transaction window; and
d) during the first reserved time slot of the first transaction window,
   i) the tag broadcasts the first set of transaction packets, and
   ii) the master detects and accepts the first set of transaction packets broadcasted by the tag;
e) wherein the master
   i) monitors and processes broadcasts on the network during a second time division block, the second time division block comprising a second configuration window and a second transaction window,
   ii) establishes a second reserved time slot, the second reserved time slot comprising a second slice of time within the second transaction window of the second time division block during which the master will accept a second set of transaction packets broadcasted by the tag;
   iii) determines a tag period for the tag, the tag period comprising a fixed amount of time that the tag should wait between broadcasting the first set of transaction packets and broadcasting the second set of transaction packets, the fixed amount of time being calculated so that the second set of transaction packets broadcasted by the tag will be broadcasted only during the second reserved time slot in the second transaction window of the second time division block;
   iv) includes the tag period in the configuration response broadcasted from the master; and
   v) after the fixed amount of time in the tag period has elapsed and during the second reserved time slot of the second transaction window of the second time division block, detects and processes the second set of transaction packets broadcasted by the tag.

18. The data communications network of claim 17, wherein:
a) the master determines during the second transaction window that the elapsed time between the master detecting the first set of transaction packets broadcasted by the tag and the master detecting the second set of transaction packets broadcasted by the tag is not equal to the amount of time in the tag period calculated by the master; and
b) the master broadcasts a transaction response to the second set of transaction packets, the transaction response including an adjusted tag period for the tag;
c) wherein the adjusted tag period in the transaction response is calculated by the master to change the amount of time that the tag should wait between broadcasting the second set of transaction packets and broadcasting a third set of transaction packets.

19. The wireless data communication network of claim 18, wherein the adjusted tag period for the tag is calculated by the master according to the formula:

$$t_{adjust} = \mathrm{mod}(t_{transaction}, t_{block}) - \mathrm{mod}(t_{rx}, t_{block}),$$

where, $t_{adjust}$ is the adjusted tag period,
$t_{transaction}$, is the expected time of receiving the transaction packet,
$t_{block}$ is the duration of the time division block, and
$t_{rx}$ is the time the packet was actually received.

20. The data communications network of claim 17, wherein a length of the second time division block is equal to a length of the first time division block.

21. The data communications network of claim 17, wherein a length of the second time division block is not equal to a length of the first time division block.

22. The data communications network of claim 17, wherein the second time division block begins immediately in time after the first time division block ends.

23. The data communications network of claim 17, wherein the second time division block does not begin immediately in time after the first time division block ends.

24. The data communications network of claim 17, wherein:
   a) the master monitors broadcasts on the network during a plurality of time division blocks comprising a plurality of transaction windows, respectively;
   b) the master broadcasts a plurality of reserved time slots, each falling within a transaction window in the plurality of transaction windows, respectively, the plurality of reserved time slots marking a plurality of time slices during which the master will accept a subsequently-broadcasted set of transaction packets from the tag; and
   c) during at least one of the plurality of reserved time slots in at least one of the plurality of transaction windows in at least one of the plurality of time division blocks, the master detects and processes the subsequently broadcasted set of transaction packets from the tag.

25. The data communications network of claim 24, wherein:
   a) the master broadcasts the tag period to the tag during at least one of the plurality of configuration windows within at least one of the plurality of time division blocks; and
   b) the tag period further comprises a fixed amount of time that the tag should wait between each broadcast of the subsequently-broadcasted sets of packets, the fixed amount of time being calculated so that said each broadcast of the subsequently broadcasted set of transaction packets will be broadcasted only during one of the plurality of reserved time slots in the plurality of transaction windows in the plurality of time division blocks.

26. The data communications network of claim 17, wherein the configuration response packet broadcasted by the master comprises a network identifier for the master, the network identifier uniquely identifying the data communications network associated with the master.

27. The data communications network of claim 17, wherein:
   a) the tag is configured to broadcast a two-way ranging request packet during the first reserved time slot of the transaction window;
   b) the master is configured to accept the two-way ranging request packet and broadcast a two-way ranging response packet during the first reserved time slot of the transaction window; and
   c) the tag is configured to receive the two-way ranging response packet and broadcast a two-way ranging acknowledgment packet during the first reserved time slot of the transaction window.

28. The data communications network of claim 27, wherein the master is further configured to:
   a) track the transmission and flight times for the two-way ranging request packet, the two-way ranging response packet and the two-way ranging acknowledgment packet;
   b) based on the transmission time and flight times, determine the distance between the tag and the master; and
   c) based on the distance between the tag and the master, determine the location of the tag in a three-dimensional space.

29. The data communications network of claim 27, wherein the configuration response packet broadcasted by the master further includes a network timeout for the tag, the network timeout indicating how many consecutive times that the tag should broadcast the two-way ranging request packet without receiving the two-way ranging response packet broadcasted by the master.

30. The data communications network of claim 17, wherein:
   a) the first configuration window of the first time division block is reserved by the master for exchanging configuration packets between the tag the master;
   b) the first transaction window of the first time division block is reserved by the master for exchanging transaction packets between the tag and the master
   (c) the second configuration window of the second time division block is reserved by the master for exchanging configuration packets between the tag the master; and
   d) the second transaction window of the second time division block is reserved by the master for exchanging transaction packets between the tag and the master.

31. The data communications network of claim 17, wherein:
   a) the data communications network further comprises a slave device; and
   b) the first time division block further comprises a slave window, the slave window being reserved for exchanging a set of slave transaction packets between the slave and the master.

32. The data communications network of claim 31, wherein:
   a) the slave device is configured to broadcast a two-way ranging request packet during the reserved time slot of the slave window;
   b) the master is configured to accept the two-way ranging request packet and broadcast a two-way ranging response packet from the master during the reserved time slot of the slave window;
   c) the slave device is configured to receive the two-way ranging response packet and broadcast a two-way ranging acknowledgement packet from the slave during the reserved time slot of the slave window.

* * * * *